May 2, 1967  H. W. TROLANDER ETAL  3,316,765
EXTENDED RANGE THERMISTOR TEMPERATURE SENSING
Filed Aug. 19, 1965
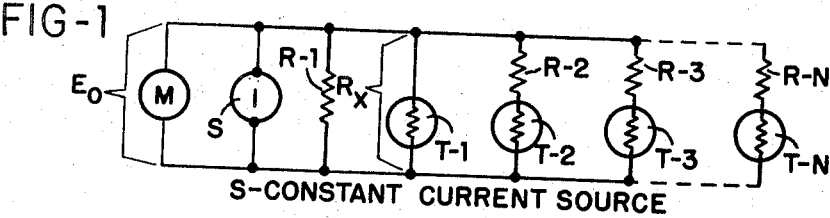
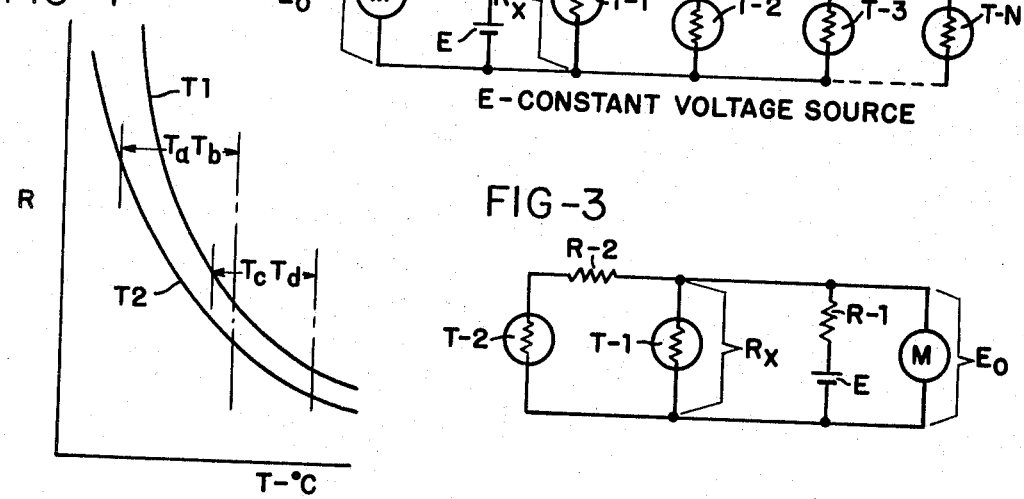
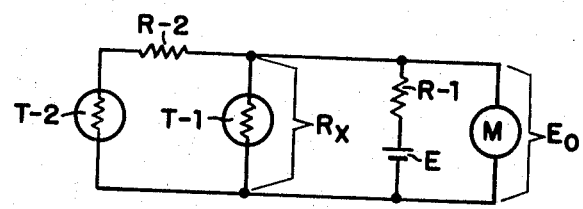
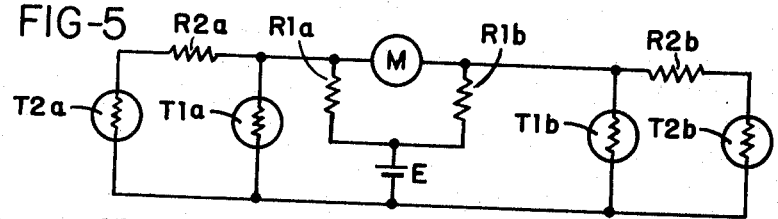
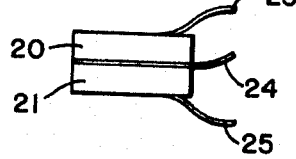
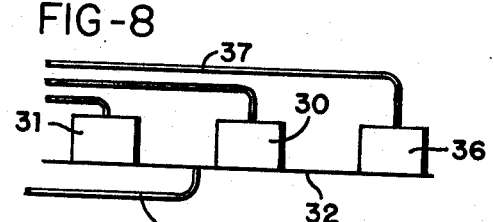
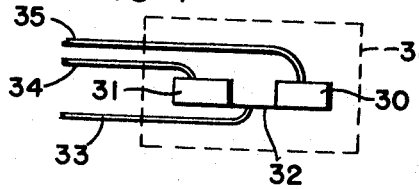
INVENTORS
HARDY W. TROLANDER &
BY  RAY W. HARRUFF
*Marechal, Biebel, French & Bugg*
ATTORNEYS

United States Patent Office 3,316,765
Patented May 2, 1967

3,316,765
EXTENDED RANGE THERMISTOR TEMPERATURE SENSING
Hardy W. Trolander and Ray W. Harruff, Yellow Springs, Ohio, assignors to The Yellow Springs Instrument Company, Inc., Yellow Springs, Ohio, a corporation of Ohio
Filed Aug. 19, 1965, Ser. No. 480,958
14 Claims. (Cl. 73—362)

ABSTRACT OF THE DISCLOSURE

A temperature measuring instrument having a plurality of semi-conductor thermistors with distinct and overlapping ranges of linear temperature response, connected in parallel and in circuit with appropriate resistances so that the range of linear temperature response of the instrument includes the ranges of linear response of all of the thermistors.

---

This application is a continuation-in-part of copending application, Ser. No. 407,190, filed Oct. 28, 1964, and now abandoned.

This invention relates to a method and apparatus for temperature sensing and measuring and particularly to devices and circuits with which the normally expected linear response of thermistor temperature sensing devices can be substantially extended.

Thermistors are commonly used in various devices where a temperature is sensed, either directly for the purpose of measuring the temperature of an environment or comparing it with the temperature of another environment, or where a change in temperature sensed by the thermistor is utilized to provide a measurement of a change in some other parameter, such as a change in mass flow of a fluid causing more or less cooling of a thermistor which might be heated to a predetermined temperature. Generally speaking, these devices operate by exposing the thermistor to the environment to be sensed and establishing a reading corresponding to the electrical resistance exhibited by the thermistor in accordance with the known variation in electrical resistance of the thermistor at different temperatures. In this specification, therefore, the terms "temperature sensing device" or "temperature sensing apparatus" are intended to include both those devices which measure temperature directly, or utilize a temperature measurement to establish a measurement of some other parameter.

As examples of devices which may sense a temperature, or a change in temperature, and relate it to other parameters, the present invention is useful in devices for measuring relative humidity, where it is necessary, as is well known, to obtain a "wet bulb" and "dry bulb" temperature, thereby determining the rate of evaporation of moisture, and the consequent cooling effect, which is then related to the amount of moisture in the air to determine the relative humidity.

The present invention may also be useful in wind velocity or direction measuring devices, where the sensing elements can be arranged to sense the cooling effect of wind on the sensing apparatus, for purposes of velocity measurement, or to sense the difference in cooling effect upon several of the sensing devices mounted in a predetermined spaced arangement and thereby to determine wind direction. The use of thermistor sensing devices in these types of apparatus is particularly of value in that the devices are quite small and are passive, thus not subject to wear, and offering a minimum of restriction on the shape of the sensing device, which in turn can be designed to offer the minimum resistance to flow, maximum desired exposure to the fluid being sensed, and to take into account other desirable design factors.

Furthermore, temperature sensing probes embodying thermistors are advantageous from the standpoint of small size and rapidity of response to changes in temperature, as well as increased sensitivity as compared with other devices, such as thermocouples. However, generally speaking thermistors used for this purpose do not have an adequate range of response, or their response is so deviant from linear that the output at one end of the range or the other is impaired, or in some cases of no value since it is unreliable. Various attempts have been made to linearize the response of thermistors, but generally the result has been to reduce the sensitivity of the thermistor to the point where it no longer has any advantage over other devices which can be used for the same purpose.

The present invention is based in part upon the fact that by shunting a thermistor, by using a predetermined electrical resistance, it is possible to reduce the sensitivity of the thermistor by only about 30%, which is considered acceptable, while maintaining an effective and adequate sensitivity which has the aforementioned advantages.

The present invention is particularly concerned with maintaining substantially constant linearity of response from temperature sensing thermistors and associated circuits over temperature ranges of, for example, 1° C. to 100° C., whereas a 20° C. span of acceptable sensitivity and response is considered about normal for present thermistor temperature sensing devices as provided by this invention. It has been possible with this invention to obtain a sensitivity and linearity of response within deviations of 0.2% over a 100° C. range, and within deviations of less than 0.1% within a 50° C. range.

Accordingly, the primary object of this invention is to provide a novel thermistor temperature measuring circuit capable of responding, with the usual rapidity and sensitivity of thermistors, but over a possible range of temperatures which is substantially in excess of the practical range of response available from a single thermistor.

Another object of the invention is to provide a thermistor temperature measuring circuit in which a first thermistor capable of providing a predetermined substantially constant change of resistance with respect to change of temperature through a first higher range of temperatures is connected in a parallel circuit with a series circuit made up of a fixed electrical resistance and a second thermistor which exhibits an essentially constant change of resistance with respect to temperature change through a lower range of temperatures which overlaps somewhat the higher range, thereby providing a circuit which will respond in a substantially constant manner from the lowest temperature of the lower range to the highest temperature of the higher range.

Another object of the invention is to provide a thermistor temperature measuring network in which a first thermistor capable of providing a predetermined substantially constant change of resistance with respect to change of temperature through a first and highest range of temperatures is connected in a parallel circuit with a plurality of series circuits each made up of a fixed electrical resistance and a further thermistor which exhibits an essentially constant change of resistance with respect to temperature change through a successively overlapping lower range of temperatures the highest of which overlaps somewhat the highest range, thereby providing a circuit which exhibits improved linearity from the lowest temperature of the lowest range to the highest temperature of the highest range.

An additional object of the invention is to provide a novel thermistor temperature measuring circuit which is capable of providing output related accurately to differences in temperature which differences are substantially greater than can presnetly be accurately compared by thermistor measuring circuits.

Another object of the invention is to provide a novel thermistor measuring device capable of accurately measuring temperature differences where both extremes of temperature may be changing, either changing in the same sense, e.g., rising or falling together at approximately the same rate, or changing at different rates or in different senses.

Another object of the invention is to provide a temperature sensing device in the form of a unitary probe comprised of two or more thermistors which can be exposed to the same ambient temperature, but wherein each of the thermistors has a different and unique temperature-to-resistance characteristic, such characteristics being predetermined and related with respect to a predetermined range of temperature to which an accurate response is desired.

Another object of the invention is to provide a novel method of accurately measuring changing temperatures over a predetermined range with thermistor devices which, of themselves, are not capable of accurate response over the desired temperature range to be covered by the temperature measuring device.

Other objects and advantages of the invention will be apparent from the following description, the accompanying drawings and the appended claims.

In the drawings—

FIG. 1 is a circuit diagram illustrating a typical thermistor temperature measuring circuit provided by the present invention, employing a constant current source;

FIG. 2 is a circuit diagram of a modified form of circuit, employing a constant voltage source;

FIG. 3 is a circuit diagram of a further modified form of the invention;

FIG. 4 is a graph illustrating the manner in which the response of two thermistors is combined in accordance with the invention;

FIG. 5 is a circuit diagram of another modification;

FIG. 6 is a diagrammatic view of a dual thermistor arrangement for use in a probe constructed according to the invention;

FIG. 7 is a diagrammatic view of another form of dual thermistor construction; and FIG. 8 is a similar view showing an embodiment using three thermistors.

Referring to the drawings which illustrate preferred embodiments of the present invention, FIGS. 1 and 2 are circuit diagrams for two essentially equivalent forms or embodiments of the invention, employing multiple thermistors for the purpose of achieving optimum linearity in response over a range of temperatures substantially larger than is available from a single thermistor. It will be appreciated that the extent of temperature range over which linear response is desired, and the degree of linearity of response which can be achieved, is dependent upon the number of thermistors, and their respective ranges of essentially linear response, that may be used in a given circuit. In view of this, the circuits, FIGS. 1 and 2, illustrate an embodiment incorporating three thermistors identified as T-1, T-2 and T-3, and an extension of the circuit is illustrated by showing a further thermistor T-N which will be understood to represent the highest in the number of the plurality of thermistors used.

Since in most respects the circuits shown in FIGS. 1 and 2 are alike, they will be described simultaneously, with the differences being noted during the explanation. The thermistor T-1 is shown in FIG. 1 as being connected across a source of electrical energy consisting of a constant current source S and a fixed resistor R-1 connected in shunt across the source. In other words, in FIG. 1 the first thermistor T-1 is connected in parallel with this shunting resistor R-1. Also connected across this source of electrical energy is a meter M, preferably a suitable voltmeter, and the potential difference applied to this meter is the output voltage of the circuit indicated by the legend $E_o$. The equivalent resistance of the thermistor circuits is the resistance or load applied across the source as indicated by the legend $R_x$, which is the summation of the resistance of the various branches of the circuit containing the several thermistors.

The first branch, as previously described, consists of the thermistor T-1. Connected in parallel with it is the second branch consisting of a fixed resistor R-2 and the thermistor T-2. The thermistor T-1 is selected to have characteristics including an essentially linear change in electrical resistance through a first or higher range of temperatures, for example from 60° C. to 100° C. The thermistor T-2 is selected to exhibit an essentially linear change in electrical resistance through a lower range of temperatures overlapping the higher response range of T-1, for example the linear range of T-2 might be from 30° C. to 70° C. The fixed electrical resistance R-2 is in series circuit with T-2, therefore, the flow of current through the combination of R-2 and T-2, shunting T-1, will also have an effect on the output voltage of the circuit. Expressed another way, the output potential difference $E_o$ will depend upon the summation of current flow through T-1 and through the series circuit consisting of R-2 and T-2.

A third thermistor T-3 and a third fixed resistance R-3 are connected in a further series circuit which is in turn connected in parallel with T-1, and hence provides another and different shunting circuit for T-1. The thermistor T-3 is circuited to exhibit an essentially linear change in electrical resistance over a still lower range, for example, from 0° C. to 40° C. The circuit can be extended, as desired, by the addition of further such shunting branches, each comprising an additional series circuit of a predetermined fixed resistor and a thermistor. This is shown in FIGS. 1 and 2 by the additional circuit including the fixed resistor R-N and the thermistor T-N in series with it.

The circuit shown in FIG. 2 is, in essense, the same as that shown in FIG. 1 and represents the application of Thevenin's theorem, wherein the constant voltage source E and the fixed resistor R-1 in series with it provide the source of electrical energy, instead of the constant current source S and fixed shunting resistor R-1 shown in FIG. 1. In FIG. 2, as in FIG. 1, the output voltage $E_o$ is applied as a potential difference across the meter M, and the equivalent resistance of the various branches making up the thermistor temperature since a circuit is indicated by the legend $R_x$.

For some purposes there are advantages in employing a constant voltage source rather than a constant current source. For example, in order to obtain a constant current it may be necessary to use relatively high sources of potential, or this might be achieved by servo systems used to regulate the current output. In either event the equipment required may be more complicated or cumbersome than is desired. On the other hand, by using a constant voltage source, such as a nickel-cadmium battery, together with the isolating resistor R-1, which is of a fixed value dependent upon $R_x$, a simple power supply is achieved. It is desirable to recover as much of the excitation voltage, from the source E, in usable signal, for example in telemetry systems. In addition to obtain maximum clarity of communication or information from the source of measurement, the form of the voltage output $E_o$ should maintain a linear relationship with the changes in the parameter being measured over the entire range through which the parameter may vary.

In a circuit of either type, the equivalent resistance $R_x$ is determined by adding the reciprocals of the vari- In a circuit of either type, the equivalent resistance $R_x$ is determined by adding the reciprocals of the various resistance shunt circuits, i.e. R-2+T-3 and R-3+T-3 and T-1, to obtain the reciprocal of $R_x$. Where the source is considered to be a constant current source, as in FIG. 1, since the current is a constant it may be cancelled in the calculations, whereby applying Ohm's law, the output voltage $E_o$ will be directly proportional to the equivalent resistance $R_x$ in parallel with R-1. In similar fashion, where as in FIG. 2 the source is considered to be a constant voltage source, where R-1 forms one half of a voltage divider circuit with $R_x$ and isolates the source from the output, the output voltage $E_o$ will likewise be proportional to and dependent upon the equivalent resistance $R_x$.

For purposes of further explanation a simplified circuit is shown in FIG. 3, wherein a constant voltage source E and the resistor R-1 constitute a source of electrical energy applied to the temperature sensing circuit, and wherein the meter M is connected to read the output voltage $E_o$. Here, the equivalent resistance $R_x$ of the thermistor circuits includes the resistance of T-1 and of the series circuit including T-2 and the fixed resistance R-2, connected in parallel with T-1. For purposes of consideration, T-1 again is selected to exhibit an essentially linear change in electrical resistance through a first higher range of temperatures, and this is shown on the plot of resistance against temperature (in ° C.) in FIG. 4. The curve labeled T-1 represents the change in resistance with respect to changes in temperature for thermistor T-1, and it will be considered for purposes of explanation that this change is essentially linear over the range indicated by the legend $T_c-T_d$. Similarly, the thermistor T-2 is selected to exhibit an essentially linear change in resistance through a lower range of temperatures overlapping the higher range of linear response of T-1. Thus in FIG. 4 the curve labeled T-2 represents the resistance change with temperature of T-2, and this is considered to be essentially linear over the range $T_a-T_b$. It will be noted that this range overlaps the essentially linear range of T-1.

The resistance of R-1 should be equal to the total resistance of the network made up by T-1, T-2, and R-2, i.e., the equivalent of $R_x$, at some temperature intermediate the limits of the range of the system, that is, intermediate the maximum upper and lower temperatures between which the response of the system will be essentially linear. Just what this predetermined temperature will be will depend upon various factors determined in the makeup of a particular circuit in accordance with the invention. Generally speaking, the temperature at which the resistance of R-1 will equal the resistance of the temperature sensing network will be displaced from the middle of the range of response toward the higher limit of such range. Also, the amount of displacement of the temperature at which this equalization occurs will depend additionally upon the differences in temperature-resistance characteristics of the thermistors T-1 and T-2 used to make up a particular circuit.

The two thermistors T-1 and T-2 are mounted in close physical relation such that they both respond simultaneously to the same temperature to be sensed. Suitable arrangements are shown in FIGS. 6 and 7 and are later described. Therefore, each of the two thermistors exhibits a unique change in electrical resistance according to a change in the temperature being sensed. It has been found that in this system, where T-1 is the "active" resistor at the higher range, whereas T-2 is more "active" at the lower range, T-2 should be less sensitive, therefore it should have characteristics such that the curve representing its change of resistance or change of temperature ($dR/dT$) has less slope. The thermistor more active at the lower range should be less sensitive.

With reference to FIG. 4, it will be noted that the plot for the thermistor T-1 shows that over a higher range of temperatures the rate of change of resistance is relatively constant. In other words, the slope of the plot line remains substantially the same throughout this higher range of temperatures, which has been indicated on the drawing as $T_c-T_d$. At lower temperature this thermistor T-1 exhibits a more substantial deviation in resistance with change of temperature, and thus tends to be inaccurate when used to measure these lower temperatures. Similarly, as shown by the plot for T-2, its response is best, and almost constant, through the range $T_a-T_b$. It should be noted also that these ranges overlap somewhat, in other words, $T_b$ is somewhat greater than $T_c$.

By providing a series resistance (R-2) for T-2, its response in the range of $T_a-T_b$ can be substantially modified, to the extent that the total resistance in this part of the circuit remains essentially constant once a temperature in the neighborhood of $T_b$ has been reached. By connecting T-1 in shunt across this series circuit, the sensitivity of T-2 in its effective range is reduced only within acceptable limits, for example about 30% or less.

Bearing in mind that the change in resistance of the network as a whole determines the value of the output voltage, for thermistors exhibiting a decrease in resistance such as indicated in FIG. 4, the fixed resistance R-2 is related to the resistance of T-2 such that at lower temperatures (higher resistance of T-2) a change in temperature will change the resistance of T-2 to reflect a significant change in the resistance of the entire series branch. Thus R-2 will have a value relatively lower than T-2 at the lower end of its range ($T_a$). As the temperature approaches $T_b$, the resistance of T-2 will become quite small relative to R-2, and the resistance of this branch of the circuit at this temperature and higher is essentially the fixed resistance R-2.

Thus, when operating in the higher portion of the range of the composite system or circuit, the active thermistor is T-1, over its range $T_c-T_d$, and the series circuit of T-2 and R-2 remains in the circuit effectively static in spite of the temperature being sensed.

FIG. 5 illustrates a circuit embodying the principles of the invention for measurement of temperature differentials. Comparison of the circuit with that shown in FIG. 3 will demonstrate that there are in fact duplicate "dual-thermistor" temperature measuring circuits of the same type as shown in FIG. 3, arranged such that the difference between the temperature sensed by the first pair of thermistors T-1a and T-2a and the second pair of thermistors T-1b and T-2b is applied across the meter M. Therefore, the potential difference between the two circuits is represented on the meter or other measuring circuit which the meter represents. Each of these circuits can be expanded according to FIG. 2, if greater range or closer tolerance on linearity is desired.

The present invention also provides a novel method of measuring the temperature of environment, whereby it is possible to use thermistor temperature measuring circuits and still obtain accurate measurement of relatively wide temperature variations. In accordance with the method, multiple thermistors are chosen having different but related response to changes in temperature, as previously explained herein. These thermistors are connected in an electrical resistance circuit such as provided by this invention, and the thermistors are exposed simultaneously to the environment the temperature of which it is desired to obtain or to monitor. A source of electrical energy of predetermined value, such as a constant biasing potential, is applied to the circuit, and hence across the thermistors, and by measuring the change in resistance of the circuit in response to changes in temperature of the environment, it is possible to determine accurately the temperature changes in the environment. Using the present invention, and circuits as described herein, it has been possible to obtain linearity of response in temperature measurements within a deviation of approximately 0.04% over a range of 0° C. to 100° C., and within a deviation of about 0.02% over a range of 0° C. to 50° C., and within a deviation of about 0.2% over a range of −50° C. to +150° C.

Another aspect of the invention involves the providing of multiple thermistor units or probes, in some forms as an otherwise homogeneous thermistor comprising dissimilar layers of semiconductor material. In one such form, as shown in FIG. 6, the first and second layers 20 and 21 perform, respectively, the functions of the first and second thermistors. Such a thermistor unit is provided with three output connections 23, 24, and 25 from, respectively, the junction of the layers, and the opposite sides of each layer, have been constructed. The first layer 20 in a typical unit was composed of approximately 32.3% nickel oxide and 67.7% manganese oxide (by weight), and its resistance at 25° C. is 6,000 ohms. The second layer 21 includes a small proportion of copper resulting in a decrease in its resistance to about 1,000 ohms at 25° C., and a reduction in its sensitivity. The proportions of the second layer are 3.4% copper oxide, 31.2% nickel oxide, and 65.4% manganese oxide (by weight). The sensitivity or coefficient of the first layer is 4.5% per degree centigrade at 25° C., and for the second layer the coefficient is 3.7% per degree centigrade at 25° C. The nominal diameter of each layer in this composite thermistor is approximately 0.090 inch, and each layer is in the order of 0.020 inch in thickness.

Another dual-layer thermistor has been employed successfully, with the following composition. The lower resistance layer having a resistance of 10,000 ohms at 25° C., was composed of 25% ferric oxide, 26.12% nickel oxide, and 44.88% manganese oxide (by weight). The other layer, having a resistance of 60,000 ohms at 25° C., was composed of 20% ferric oxide, 27.86% nickel oxide, and 52.14% manganese oxide (by weight).

Another suitable form of dual-layer thermistor is a variation on the first mentioned thermistor, wherein the second layer, having the 1,000 ohm resistance at 25° C., is increased in thickness to increase its resistance to 1,200 ohms at the same temperature, with all other constituents remaining the same.

It is also possible to construct a multiple thermistor probe in a somewhat different fashion, by using a first thermistor 30 and second thermistor 31 which are assembled on a common conductive plate 32. The common lead 33 extends from this plate and leads 34 and 35 extend from the two thermistors as shown in FIG. 7. Preferably, the thermistors and plate may be encapsulated in a suitable potting compound 38, as indicated schematically by the dotted lines.

Another embodiment of a multiple thermistor is shown in FIG. 8 where like reference numerals have been used to identify like elements corresponding to those shown in FIG. 7. A first thermistor 30, a second thermistor 31 and a third thermistor 36 are assembled on a common conductive plate 32. A common lead 33 extends from this plate and leads 34, 35, and 37 extend from the three thermistors. Preferably the thermistors and plate may be encapsulated in a suitable potting compound 38, as schematically shown by the dotted lines. It will be understood that comparable results can be obtained by using the same composition for all layers of the thermistors with each layer being of appropriately different size, or if desired different compositions can be used for each layer.

With such construction it is possible to provide the "multiple thermistor" circuitry of the present invention by using what, constructionwise, is a single thermistor probe, thereby obtaining the advantages of the present invention while maintaining simplicity of assembly and a minimum size probe.

While the method and forms of apparatus herein described constitute preferred embodiments of the invention, it is to be understood that this invention is not limited to these precise methods and forms of apparatus and that changes can be made therein without departing from the scope of the invention which is defined in the appended claims.

What is claimed is:

1. A method of measuring the temperature of an environment, comprising the steps of
    (a) providing at least two thermistors having different but related response to changes in temperature with the response off the individual thermistors being essentially linear over different overlapping ranges of temperature the extremes of which are the total temperature sensing limits desired,
    (b) connecting said thermistors in parallel branches of an electrical resistance circuit such that the effective resistance of one thermistor is predominant at lower temperatures and the effective resistance of the other thermistor is predominant at higher temperatures with respect to the overall resistance of the circuit,
    (c) exposing the thermistors simultaneously to an environment of which the temperature is desired,
    (d) applying a predetermined constant source of electrical energy across said thermistors,
    (e) and measuring the change in resistance of the entire circuit in response to changes in temperature of the environment causing corresponding changes in resistance of the respective thermistors.

2. The method of sensing temperature changes over a wide range comprising the steps of
    (a) providing at least two thermistors having different but related changing electrical resistance characteristics in response to changes in temperature with the response of the individual thermistors being essentially linear over different overlapping ranges of temperature the extremes of which are the total temperature sensing limits desired,
    (b) incorporating said thermistors in different parallel branches of an electrical resistance circuit such that the effective resistance of one thermistor causes a measurable and predetermined change in resistance of the entire circuit at a lower temperature range and the change of resistance of the other thermistor is the effective cause of a predetermined change of resistance of the circuit over a higher temperature range overlapping said lower range,
    (c) mounting the thermistors in side-by-side relation and exposing the thermistors simultaneously to an environment having an unknown temperature which may vary over the entire lower and higher range,
    (d) applying a predetermined constant source of electrical energy across said circuit, and
    (e) measuring the change in electrical resistance of the entire said circuit in response to temperature changes of the environment.

3. A thermistor temperature sensing circuit having a substantially linear output over a greater range than obtainable from a single thermistor, comprising a first thermistor exhibiting an essentially linear change in electrical resistance through a first higher range of temperatures, a second thermistor exhibiting an essentially linear change in electrical resistance through a second lower range of temperatures overlapping said higher range, an electrical resistance of fixed predetermined valve connected in series circuit with said second thermistor, means forming a parallel circuit connecting said first thermistor in parallel across said series circuit, a supply source circuit including a source of electrical energy and a fixed resistor connected to said source, said fixed resistor being of a value equal to the total resistance of said temperature sensing circuit at a temperature within the limits of the highest temperature of said higher range and the lowest temperature of said lower range, means connecting said supply source circuit to apply a potential across said first thermistor, output connections from said first thermistor for applying the total variable voltage drop across said parallel circuits to a readout device, and means mounting said thermistors in close physical relation such that they both respond to the same temperature to be sensed.

4. A temperature sensing circuit as defined in claim 3, including at least one additional series circuit comprising a third thermistor and a corresponding electrical resistance of fixed predetermined value, means connecting said additional series circuit in parallel with said first thermistor, and means mounting said third thermistor in close physical relation to the first and second thermistors.

5. A thermistor temperature measuring circuit having a substantially linear output over a greater range than obtainable from a single thermistor, comprising a first thermistor exhibiting an essentially linear change in electrical resistance through a first higher range of temperatures, a second thermistor exhibiting an essentially linear change in electrical resistance through a second lower range of temperatures overlapping said higher range, an electrical resistance of fixed predetermined value connected in series circuit with said second thermistor, means forming a parallel circuit connecting said first thermistor in parallel across said series circuit forming a temperature sensing circuit, a supply source circuit including a constant voltage electrical source and an isolating resistor connected in series with said source, said isolating resistor being of a value equal to the total resistance of said temperature sensing circuit at a temperature within the limits of the highest temperature of said higher range and the lowest temperature of said lower range, means connecting said supply source circuit to apply a potential across said parallel connected circuits, output connections from said parallel circuits for applying the total variable voltage drop across said parallel circuits to a readout device, and means mounting said thermistors in close physical relation such that they both respond to the same temperature to be sensed.

6. A thermistor temperature measuring circuit capable of responding in a substantially linear way by exhibiting a predetermined change in electrical resistance $dR/dT$ over a possible range of temperature variation $T_a$ to $T_d$, which range is greater than the practical range of response available from a single thermistor, comprising a first thermistor capable of providing a predetermined essentially constant $dR/dT$ through a first higher range of temperatures $T_c$ to $T_d$, a second thermistor exhibiting a predetermined essentially constant $dR/dT$ through a lower range of temperatures $T_a$ to $T_b$, wherein $T_a$ is less than $T_c$ and $T_b$ is greater than $T_c$ and less than $T_d$, a second fixed electrical resistance connected in series circuit with said second thermistor, means forming a parallel circuit path in which said first thermistor is connected in parallel with said series circuit, a supply source circuit including a source of predetermined biasing potential and a connected fixed first resistance, said fixed first resistance being of a value equal to the total resistance of said temperature sensing circuit within the limits of the range $T_a$ to $T_d$, means connecting said supply source circuit in parallel with said first thermistor and said series circuit including said second thermistor and said second fixed electrical resistance to produce a flow of electric current through both said thermistors and said fixed resistances, output connections from said parallel connected circuits for applying the variation in potential across said circuits resulting from changes in temperature to which said thermistors are subjected to a voltage sensitive readout device, and means mounting said thermistors in close phyical relation such that they both respond simultaneously to the same temperatures to be sensed.

7. A temperature sensing device comprising a first thermistor layer of semiconductor material exhibiting a first predetermined change in electrical resistance through a first higher range of temperatures, a second thermistor layer of semiconductor materal joined to said first layer and exhibiting a second predetermined change in electrical resistance through a second lower range of temperatures overlapping said higher range, electrical conductors extending from each of said thermistor layers providing for connection of said thermistors independently into an electrical circuit and a common conductor extending from the juncture of said layers whereby each of said layers is connectable independently into an electrical circuit to provide different resistance changes for each thermistor layer in response to a change in temperature of an environment to which the device is exposed.

8. A temperature sensing device comprising a first semiconductor thermistor exhibiting an essentially linear change in electrical resistance through a first higher range of temperatures, a second semiconductor thermistor of different composition from said first thermistor and exhibiting an essentially linear change in electrical resistance through a second lower range of temperatures overlapping said higher range, first and second electrical conductors extending from respective ones of said thermistors, a conductive mounting plate supporting said thermistors in close side-by-side relationship to be affected simultaneously by the temperature of a common environment to which the device is exposed, and a common conductor extending from said plate to establish separate electrical resistance paths through each of said thermistors.

9. A temperature sensing device as defined in claim 8, including a third semiconductor thermistor supported on said plate separated from but close to said first and second thermistors, and a third electrical conductor extending from said third thermistor.

10. A temperature sensing device for measuring a difference in temperature between two environments over a substantial range of differences, comprising a first temperature sensing probe including a first thermistor exhibiting a predetermined change in electrical resistance through a first higher range of temperatures and a second thermistor exhibiting a predetermined change in electrical resistance through a second lower range of temperatures overlapping said higher range, means mounting said thermistors in close physical relation such that they both respond to the same parameter to be sensed, an electrical resistance of fixed predetermined value connected in series circuit with said second thermistor, and means connecting said first thermistor in parallel across said series circuit, a second temperature sensing probe comprising a duplicate of said first probe and thus including first and second thermistors of the same type and a predetermined fixed electrical resistance as in said first probe all connected in the same manner, a supply source circuit including a source of predetermined biasing potential and a pair of like isolating resistors each having a connection to said source, means connecting said supply source circuit across the first thermistor of each of said sensing probes, a readout device sensitive to differences in potential, and connections from each of said probes to said readout device for applying the difference in potential across said probes to said readout device.

11. The method of sensing a difference in temperature between two environments of a substantial range of differences comprising the steps of
(a) providing first and second temperature sensing probes, each said probe including first and second semiconductor thermistors exhibiting a predetermined change in electrical resistance through a first higher range of temperatures and a second lower range of temperatures, respectively, the second lower range overlapping the higher range and the temperature resistance change of said second thermistor in said first higher range being negligible,
(b) each of said probes incorporating the first and second thermistors in different parallel branches of an electrical resistance circuit such that the effective resistance of the first thermistor causes a measurable and predetermined change in resistance of the entire circuit at a higher temperature range and the change of resistance of the second thermistor is the effective cause of a predetermined change of resistance of the circuit of a lower temperature range, (c) mounting the first and second thermistors in each probe in side-by-side relation such that the thermistors in each probe respond simultaneously to a change in temperature of the same environment, (d) exposing each of said probes to different environments, (e) applying a predetermined biasing potential across each of said circuits, and (f) measuring the potential difference between said circuits in response to temperature changes of the two different environments.

12. An electrical network comprising a plurality of fixed resistors and a plurality of thermistors, said thermistors being selected to exhibit essentially linear change in resistance over different ranges of temperature which overlap, the cumulative range being such that it exceeds the range of linear change in resistance that can be obtained from a single thermistor, all but one of said thermistors being connected in a series circuit with a corresponding fixed resistor and all of said series circuits being connected in parallel with each other whereby upon subjecting all of said thermistors to the same changing temperature the network as a whole will exhibit an essentially constant numerical change of resistance with changes in such temperature over a predetermined temperature range, said one thermistor having an essentially linear change in resistance over a range which extends to one of the temperature limits of the cumulative range, and a fixed resistance connected in shunt across said one thermistor and having an electrical resistance at least equal to the total resistance of the network at a temperature within the limits of said cumulative range.

13. An electrical network as defined in claim 12 including a source of constant voltage and said fixed resistor being connected in series with said constant voltage source, said source and said fixed resistor being connected across the parallel connected circuits to apply a predetermined potential to the network, and means for sensing changes in resistance of the entire network as an output voltage changing with the changes in temperature affecting all of said thermistors.

14. An electrical network as defined in claim 12 including a constant current source, said fixed shunting resistor connected in shunt across said source, means connecting said parallel connected circuits across said source, and means for sensing changes in resistance of the entire network in response to changes in temperature acting on said thermistors.

References Cited by the Examiner

UNITED STATES PATENTS

| | | | |
|---|---|---|---|
| 2,021,491 | 11/1935 | Ruben | 73—362 X |
| 2,395,192 | 2/1946 | Ostergren | 73—362 X |
| 2,456,499 | 12/1948 | Fitzinger | 73—342 X |
| 2,764,731 | 9/1956 | Koerner | 323—69 |
| 2,966,646 | 12/1960 | Baasch | 338—23 X |
| 3,052,124 | 9/1962 | Averitt | 73—362 |
| 3,107,531 | 10/1963 | Stevens | 73—362 |
| 3,186,229 | 6/1965 | Liben | 73—362 |

LOUIS R. PRINCE, *Primary Examiner.*

F. SHOON, *Assistant Examiner.*